United States Patent [19]

Ueda et al.

[11] Patent Number: 5,185,880
[45] Date of Patent: Feb. 9, 1993

[54] STORED INSTRUCTIONS EXECUTING TYPE TIMING SIGNAL GENERATING SYSTEM

[75] Inventors: Katsuhiko Ueda, Sakai; Toshikazu Suzuki, Nishinomiya; Norihito Kinoshita, Akishima, all of Japan

[73] Assignee: Matsushita Electric Industrial Co., Ltd., Osaka, Japan

[21] Appl. No.: 530,303

[22] Filed: May 30, 1990

[30] Foreign Application Priority Data

Jun. 5, 1989 [JP] Japan ................. 1-142521

[51] Int. Cl.$^5$ ............................... G06F 9/00
[52] U.S. Cl. ..................... 395/550; 364/DIG. 1; 364/271.5; 364/270; 364/262.4; 364/259.9; 364/259; 395/375
[58] Field of Search .......... 395/550, 375, 775

[56] References Cited

U.S. PATENT DOCUMENTS

| | | | |
|---|---|---|---|
| 4,231,104 | 10/1980 | St. Clair | 395/550 |
| 4,507,728 | 3/1985 | Sakamoto et al. | 395/550 |
| 4,771,377 | 9/1988 | Wiser et al. | 395/550 |
| 4,779,221 | 10/1988 | Magliocco et al. | 395/550 |
| 4,809,221 | 2/1989 | Magliocco et al. | 395/550 |

Primary Examiner—Kevin A. Kriess
Attorney, Agent, or Firm—Stevens, Davis, Miller & Mosher

[57] ABSTRACT

A stored instructions executing type timing signal generating system for flexibly generating a plurality of control timing signals having many changing points includes an instruction memory for storing a series of instructions stating contents of changes and relative time intervals between the changes of a series of control timing signals and a circuit for triggering the instruction execution by the absolute time for the series of instructions, so that after a first instruction has been executed, each succeeding instruction is sequentially executed on the basis of a relative time interval before the execution of a next instruction stated in the instructions, thereby to generate the control timing signals. The number of changing points of the control timing signals is basically dependent only on the number of words of the instruction memory, and therefore the plurality of control timing signals having many changing points can be generated easily.

3 Claims, 10 Drawing Sheets

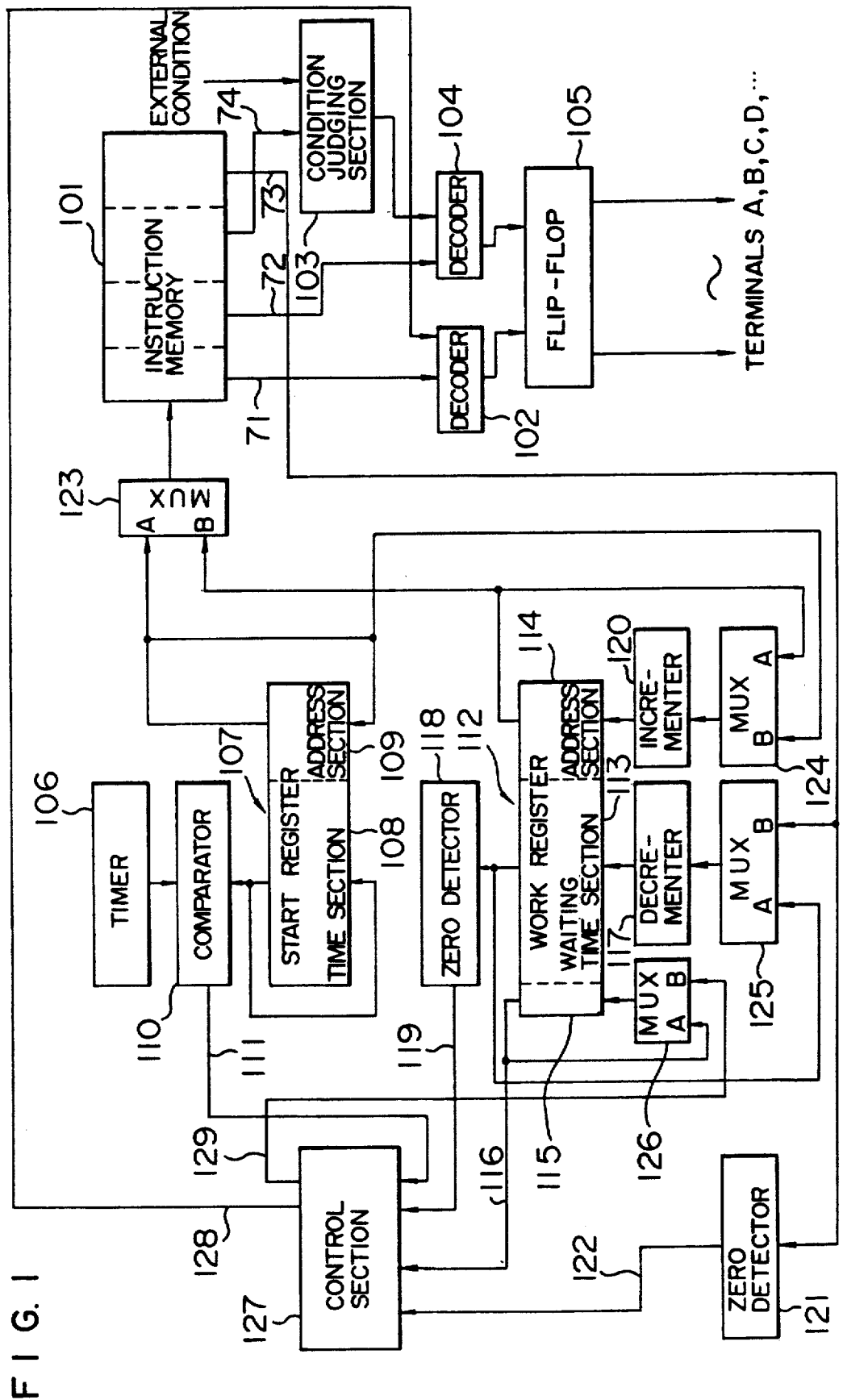
F I G. 1

| 33 OPERATION ASSIGNING SECTION | 32 OUTPUT TERMINAL ASSIGNING SECTION | 31 OUTPUT TIME ASSIGNING SECTION |
|---|---|---|
| "1" IS OUTPUTTED | TERMINAL A | n1 |
| "1" IS OUTPUTTED | TERMINAL B | n2 |
| "0" IS OUTPUTTED | TERMINAL A | n3 |
| "0" IS OUTPUTTED | TERMINAL B | n4 |
|  |  |  |
|  |  |  |
|  |  |  |
|  |  |  |

FIG. 7

| TERMINAL ASSIGNING SECTION | TERMINAL OPERATION ASSIGNING SECTION | CONDITION SECTION | WAITING TIME ASSIGNING SECTION |
|---|---|---|---|
| 71 | 72 | 74 | 73 |

FIG. 8

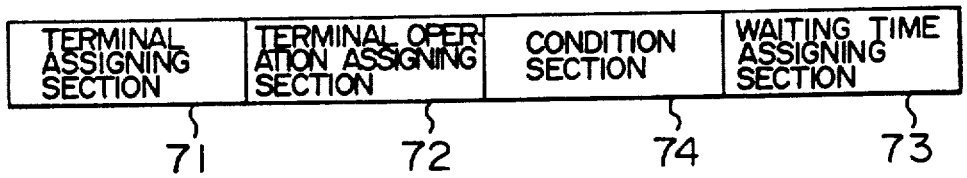

| ADDRESS | TERMINAL ASSIGNING SECTION 71 | TERMINAL OPERATION ASSIGNING SECTION 72 | CONDITION SECTION 74 | WAITING TIME ASSIGNING SECTION 73 | |
|---|---|---|---|---|---|
| n | TERMINAL A | OUTPUTTING "1" | 0 | Mt 1 | ~81 |
| n + 1 | TERMINAL B | OUTPUTTING "1" | 0 | Mt 2 | ~82 |
| n + 2 | TERMINAL A | OUTPUTTING "0" | 0 | Mt 3 | ~83 |
| n + 3 | TERMINAL B | OUTPUTTING "0" | 0 | 0 | ~84 |
| n + 4 | TERMINAL C | OUTPUTTING "1" | 0 | Mt 4 | ~85 |
| n + 5 | TERMINAL C | OUTPUTTING "0" | 0 | Mt 5 | ~86 |
| n + 6 | TERMINAL D | OUTPUTTING "1" | 0 | Mt 6 | ~87 |
| n + 7 | TERMINAL D | OUTPUTTING "0" | 0 | 0 | ~88 |

FIG. 9

| TIME SECTION | ADDRESS SECTION | | |
|---|---|---|---|
| At 1 | n | ~91 | } 107 |
| At 2 | n + 4 | ~92 | |

F I G. 14
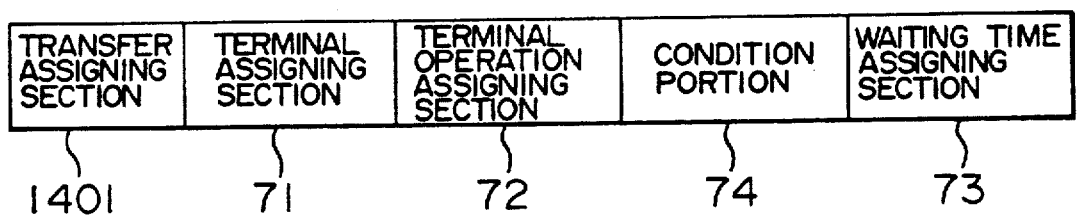
F I G. 15
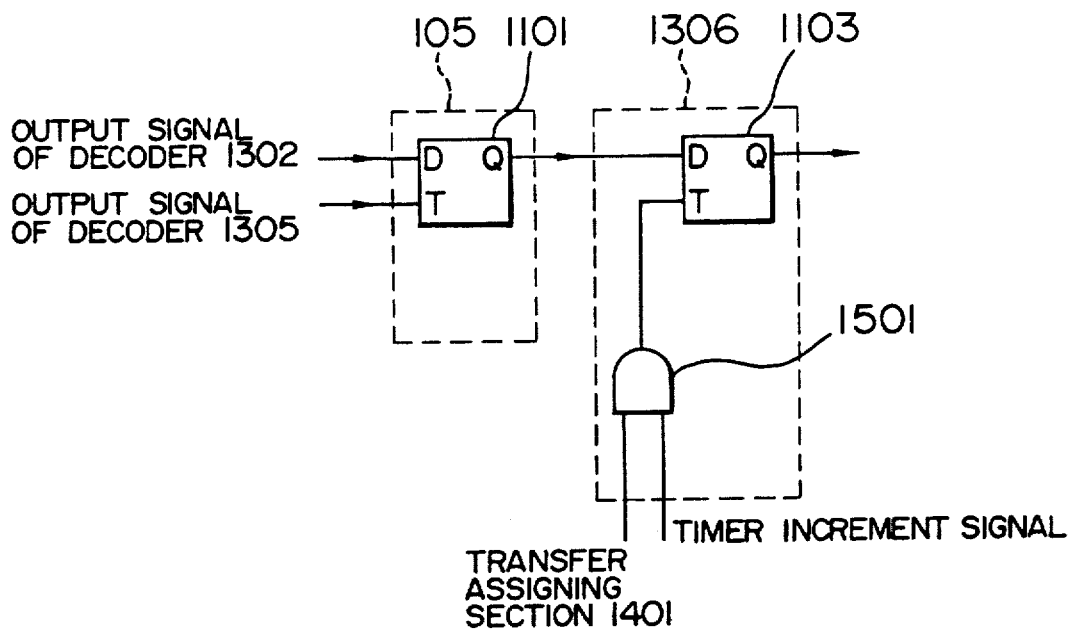

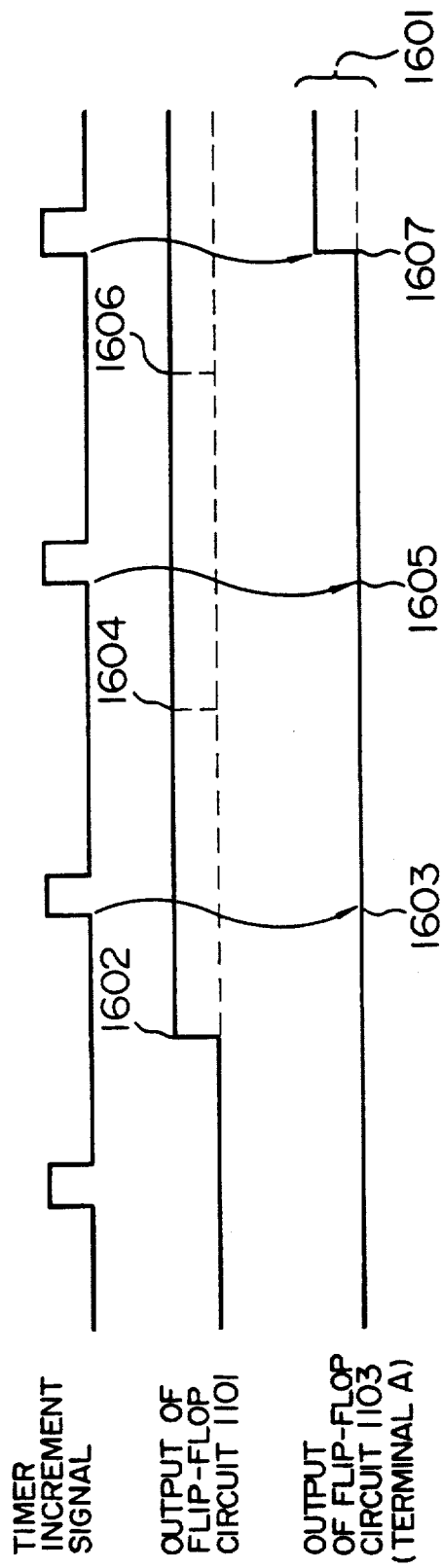

STORED INSTRUCTIONS EXECUTING TYPE TIMING SIGNAL GENERATING SYSTEM

BACKGROUND OF THE INVENTION

1. Field of the Invention

The present invention relates to a timing signal generating system suitable for equipment control which requires a large number of timing signals having a constant period, such as for TDMA digital automobile telephone (land mobile radio telephone) control, general sequence control, and the like.

2. Description of the Related Art

In the equipment control, a timing signal having a constant period is required in many cases. As systems for generating this timing signal, there are two types of systems including one type of system which generates the timing signal solely by hardware, and the other type which generates the timing signal by using both hardware and software. The latter is superior to the former in wide use applicability and flexibility in specification modification.

A prior art timing signal generating system having a structure of the latter type is described, for example, in "High Speed Output Unit", MCS-96 DATA SHEET (Intel Corporation, 1987, Order Number: 270532-001), pp. 5-6. FIG. 2 shows a simplified block diagram for the block diagram of the prior art system shown on page 19 of the above-mentioned document. With reference to FIG. 2, reference numeral 21 designates a timer for generating output reference time, and numeral 22 designates an associative memory of 8 words. One word of the 8 words, as shown in FIG. 3, is basically made up of an output time assigning section 31, an output terminal assigning section 32, and an operation assigning section 33. The reference numeral 23 designates a comparator for comparing an output of the timer 21 with the output time assigning section 31 in the associative memory 22.

Next, the operation of the prior art timing signal generating system as arranged as mentioned above will be explained. By way of example, it will be considered that a timing signal 41 as shown in FIG. 4 is generated from a terminal termed as a terminal A, and a timing signal 42 is generated from a terminal termed as a terminal B. In order to generate these timing signals, the time n1, n2, n3 and n4 at which changes 43, 44, 45 and 46 of the timing signals 41 and 42 are made to occur, the nature of the signal changes at that time, and names of terminals from which the changes are generated are stored in advance in the associative memory 22 as shown in FIG. 5. Each time the content of the timer 21 is incremented, an output of the timer 21 is compared with all the data of the output time assigning section 31 of the associative memory 22 by the comparator 23, and, when a coincidence is obtained in the comparison, a change assigned by the operation assigning section 33 is made to occur at a terminal assigned by the output terminal assigning section 32, and thus, the timing signals 41 and 42 are generated.

However, in the prior art timing signal generating system, after the timer 21 is incremented and before the next increment is performed, it is necessary to complete the comparison operation of the output of the timer 21 with the data of the output time assigning section 31 of the associative memory 22. For this reason, it is difficult to manufacture a system for generating a timing signal which has many changing points based on the idea mentioned above. More specifically, in the prior art example, although a timing signal having an accuracy of 2 micro seconds can be generated, since the number of words of the associative memory 22 is eight, a problem has been involved in that it is impossible to generate a timing signal having changing points exceeding eight.

SUMMARY OF THE INVENTION

In view of the problems in the prior art, it is an object of the present invention to provide a timing signal generating system in which the generation of a timing signal can be described by software and the timing signal having many changing points can be generated.

A timing signal generating system according to the present invention generates a plurality of timing signals by execution of an instruction which describes timing signal changes, and the timing signal generating system comprises the following features:

a) an instruction memory for storing a plurality of instructions each including at least an operation field having timing signal changes described therein, and a waiting time field having described therein a waiting time after the execution of the present instruction itself until the execution of an instruction of a next address;

b) a timer, the content of which is incremented at a constant interval T;

c) first instruction execution requesting means for storing a desired value to be compared with an output of the timer and a desired address to be output to the instruction memory, outputting the desired address stored beforehand to the instruction memory when the content of the timer becomes the desired value stored beforehand, and outputting an instruction execution signal;

d) second instruction execution requesting means for calculating an address of an instruction to be executed next time based on an address of an instruction under request for execution when the first instruction execution requesting means or the second instruction execution requesting means itself requests the execution of the instruction, storing a result of the calculation, storing a waiting time field which is described in the instruction under the request for execution, outputting the stored address to the instruction memory when the content of the stored waiting time field becomes zero as a result of subtraction performed in synchronism with the increment of the timer, and outputting an instruction execution request signal; and e) execution means for decoding at least the operation field of an instruction outputted from the instruction memory when the instruction execution request signal is outputted from the first instruction execution requesting means or the second instruction execution requesting means, and generating the timing signal.

In the present invention, owing to the arrangement described above, the first and the second instruction execution requesting means independently request to the execution means the execution of the instruction, and the timing signal is generated by the execution of the instruction in the instruction memory, which instruction describes changing points of the timing signal. The first instruction execution requesting means controls the instruction execution based on the output of the timer, and when the output of the timer indicates a desired value, the first instruction execution requesting means requests the execution. The second instruction execution requesting means can control the instruction execution, based on a waiting time before the execution of a next instruction which waiting time is indicated by the executed instruction itself.

BRIEF DESCRIPTION OF THE DRAWINGS

FIG. 1 is a block diagram of a timing signal generating system according to a first embodiment of the present invention.

FIG. 7 shows a format of an instruction used in the timing signal generating system of the present invention.

FIG. 8 shows the content of the instruction memory in the timing signal generating system of the present invention.

FIG. 9 shows the content of the start register in the timing signal generating system of the present invention.

FIG. 14 shows a format of an instruction used in the timing signal generating system of FIG. 13.

FIG. 15 is a block diagram of the flip-flops shown in FIG. 13.

FIG. 16 is a timing chart of timing signals of the timing signal generating system of FIG. 13.

FIG. 17 shows a format of another instruction used in the timing signal generating system of FIG. 13.

DESCRIPTION OF THE PREFERRED EMBODIMENTS

FIG. 1 shows a first embodiment of the present invention. Before explaining the structure, the idea of a timing signal generating method which is a basic concept of a timing signal generating system of the present invention will be described.

In a timing signal used for the equipment control, there are few cases in which positions of signal changing points can be defined only by the absolute time, and in many cases, the positions can be defined by a relative relationship between the changing points.

Figure 2:
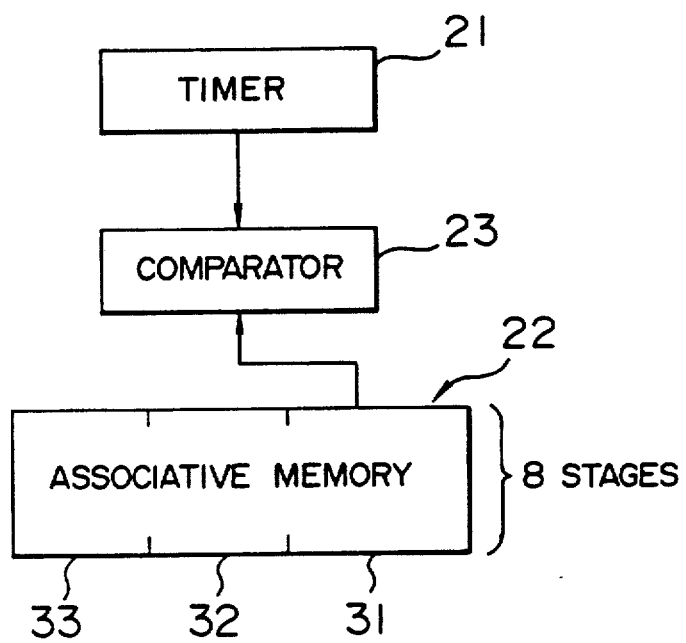
FIG. 2 is a block diagram of a prior art timing signal generating system.
Figure 3:
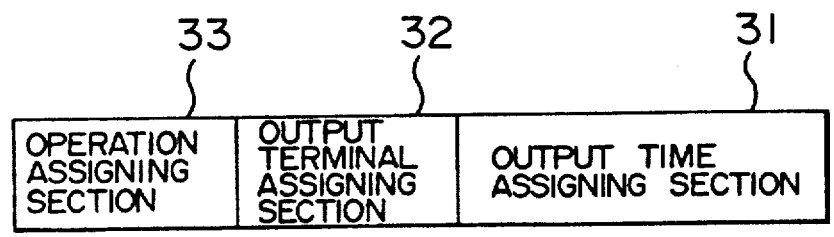
FIG. 3 shows a format of an instruction used in the prior art timing signal generating system.
Figures 4, 5:
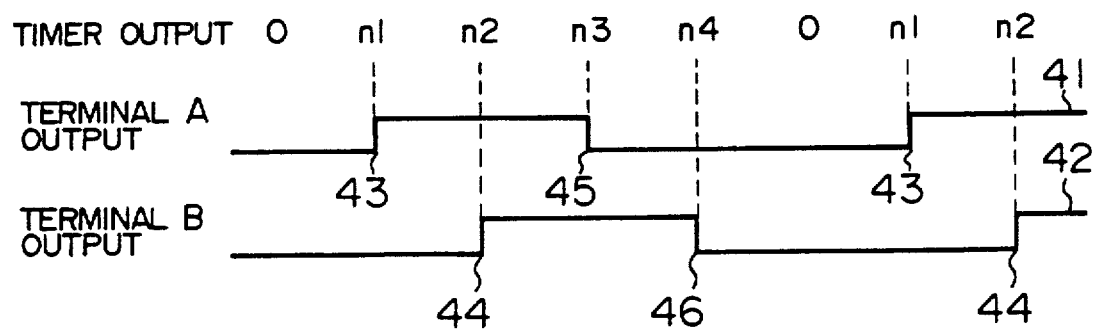
FIG. 4 is a timing chart of timing signals of the prior art timing signal generating system.
FIG. 5 shows the content of an associative memory of the prior art timing signal generating system.
Figure 6:
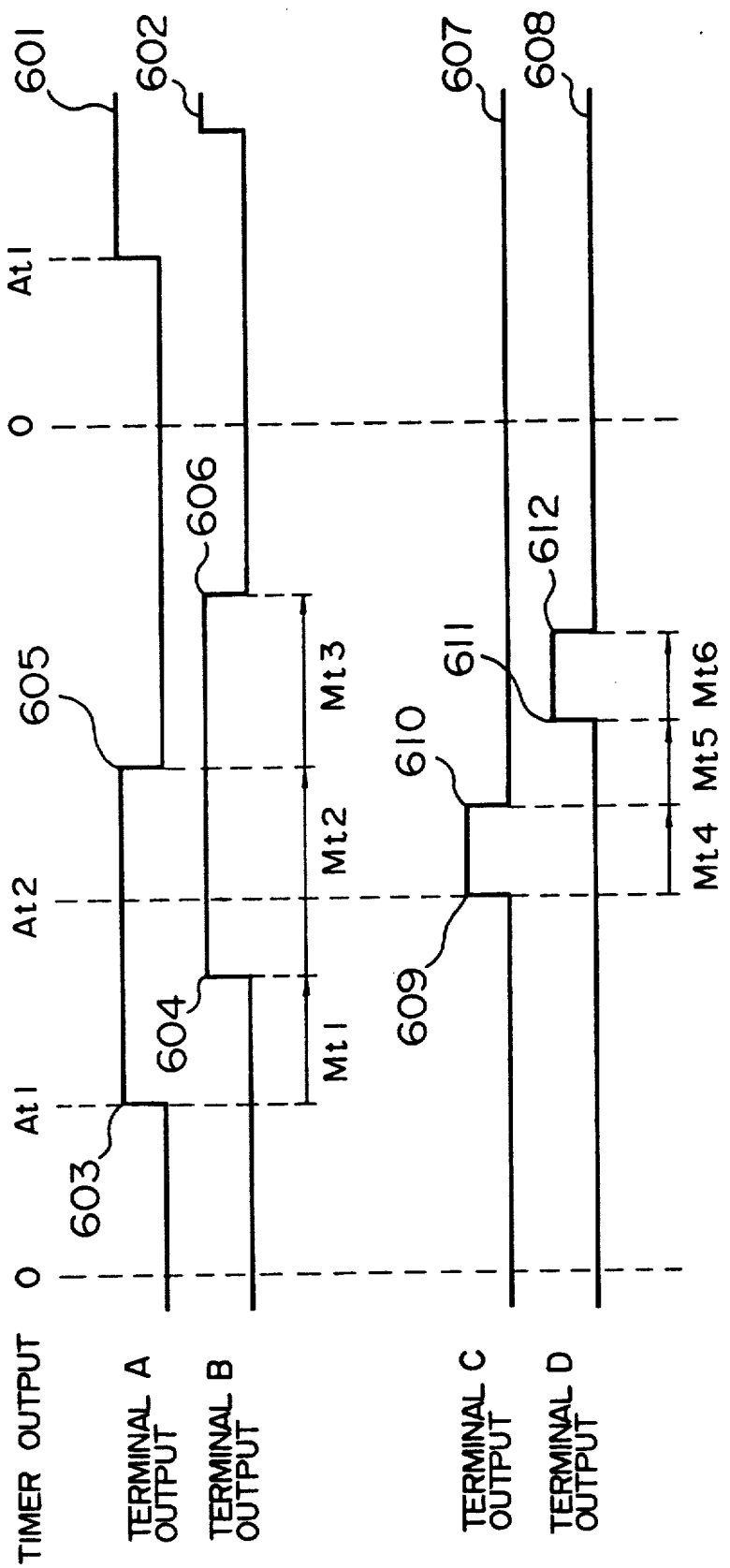
FIG. 6 is a timing chart of timing signals of the timing signal generating system of the present invention.

For example, in FIG. 6, among changing points 603 to 606 of timing signals 601 and 602, since the changing point 603 is the first changing point which occurs after a timer for indicating an output standard time indicates zero (0), there is no other way to assign the changing point 603 than to assign by using the absolute time AT1 indicated by the timer. However, the positions of the changing points 604, 605 and 606 can be defined by relative time intervals Mt1, Mt2 and Mt3 from the changing points 603, 604 and 605 which are respectively preceding by one changing point. Similarly, among changing points 609 to 612 of timing signals 607 and 608, if the position of the changing point 609 is unable to be defined by a relative time interval from the changing point 604 by some reason, it will be defined by the absolute time At2 indicated by the timer. However, the positions of the changing points 610, 611 and 612 can be defined by relative time intervals Mt4, Mt5 and Mt6 respectively from the changing points 609, 610 and 611 preceding by one changing point.

In the prior art example, the timing signal generating system is arranged based on the idea of controlling the timing signal changes only by the absolute time such as At1 and At2. By contrast, in the present invention, the timing signal generating system is arranged based on the idea that the timing signal changing positions can be controlled by both the absolute time such as At1 and At2 and the relative time intervals such as Mt1, Mt2, . . . , Mt6.

Specifically, in FIG. 1, the generation of changes (for example, the changing points 603 and 609 shown in FIG. 6) defined by the absolute time is controlled by an arrangement centering around a timer 106 and a start register 107, and the generation of changes (for example, the changing points 604 to 606 and 610 to 612) defined by the relative time intervals is controlled by an arrangement centering around a work register 112 and a zero detector 118.

Next, the structure of the block diagram shown in FIG. 1 will be described. With reference to FIG. 1, reference numeral 101 designates an instruction memory, and the timing signals shown in FIG. 6 are generated by executing instructions stored in the instruction memory 101. More specifically, by executing the instructions, the timing signal changes 603 to 606 and 609 to 612 are generated. The instruction, as shown in FIG. 7, is made up of a terminal assigning section 71 for assigning a terminal name which performs operation, a terminal operation assigning section 72 for assigning the content which is outputted from the selected terminal, a waiting time assigning section 73 for assigning a waiting time until the next change occurs, and a condition section 74 for assigning whether an operation of the terminal is to be performed or not by judging an external condition. In the case, where the changes 603 to 606 and 609 to 612 shown in FIG. 6 are to be generated, instructions 81 to 88 for generating individual changes as shown in FIG. 8 are stored at addresses beginning with an n address of the instruction memory 101.

Reference numeral 102 designates a decoder which decodes a terminal name designated by the terminal assigning section 71 of the instruction, and when an execution request signal 128 described later is at a "1" level, the decoder 102 outputs a write signal to a flip-flop 105 corresponding to the terminal name.

Reference numeral 103 designates a condition judging section which judges an external condition when the condition section 74 of the instruction is at a "1" level, and when the external condition is "1", the condition judging section 103 outputs a "1" level, whereas when the external condition is "0", a "0" level is output. Nevertheless, when the condition section 74 of the instruction is "0", the condition judging section 103 does not judge the external condition and always outputs a "1" level. Reference numeral 104 designates a decoder which outputs a value of Table 1 described later in accordance with an output of the terminal operation assigning section 72 of the instruction and an output of the condition judging section 103.

Reference numeral 105 designates a flip-flop including a plurality of flip-flop circuits respectively outputting terminal signals, and the flip-flop 105 receives a write signal from the decoder 102 and receives write data from the decoder 104.

Reference numeral 106 designates a timer which generates output standard time having a constant period, and the content of the timer 106 is increased in response to an increment signal supplied externally.

Reference numeral 107 designates a start register for executing an instruction in accordance with the absolute time generated by the timer 106, and the start register 107 includes a time section 108 and an address section 109. When the changes 603 and 609 in FIG. 6 are to be generated, as shown in FIG. 9, the absolute time At1 corresponding to the changing point 603 and an address n of the instruction memory 101, at which the instruction 81 is stored, are stored in one register 91 which constitutes a part of the start register 107. And similarly, the absolute time At2 corresponding to the changing point 609 and an address n+4 of the instruction memory 101, at which the instruction 85 is stored, are stored in the other register 92 which constitutes the other part of the start register 107. The start register 107 is constituted by two words as shown in FIG. 9.

Reference numeral 110 designates a comparator for comparing an output of the timer 106 with all data of the time section 108 of the start register 107, and, when both the output and the data are coincident with each other, the comparator 110 outputs a coincidence signal 111 which assumes a "1" level.

Reference numeral 112 designates a work register which is used to generate the changing points 604 to 606 and 610 to 612 as shown in FIG. 6, that is, to generate next timing signal changes based on relative time intervals from changing points respectively preceding by one changing point. The work register 112 includes a waiting time section 113 which takes, as an initial value, the value of the waiting time assigning section 73 of the instruction outputted from the instruction memory 101, an address section 114 which takes, as an initial value, the value of the address section 109 added with one. The value of the address section 109 is outputted from the start register 107. The address section 114 outputs the address therein to the instruction memory 101. The work register 112 further includes a flag section 115 for indicating by a value of "1" that the contents of both the waiting time section 113 and the address section 114 are effective. The output of the flag section 115 becomes a read flag signal 116. Furthermore, the work register 112 is provided with the same number of words (two words in this embodiment) as the start register 107, and the content of the work register 112 is read out, operated, and written in synchronism with the increment of the timer 106.

Reference numeral 117 designates a decrementer for decrementing the content of the waiting time section 113 of the work register 112 in synchronism with the increment of the timer 106.

Reference numeral 118 designates a zero detector for judging whether the content of the waiting time section 113 of the work register 112 is zero or not, and the zero detector 118 outputs a zero detection signal 119 which assumes a "1" level when zero is detected.

Reference numeral 120 designates an incrementer which adds 1 to the output of a multiplexer 124 described later when an execution request signal 128 described later is at a "1" level, and adds 0 to the output of the multiplexer 124 when the execution request signal 128 is at a "0" level.

Reference numeral 121 designates a zero detector which judges whether the waiting time section 73 of the instruction which is an output of the instruction memory 101 is zero or not, and when zero is detected, a zero detection signal 122 which assumes a "1" level is outputted.

Reference numerals 123, 124, 125, and 126 respectively designate multiplexers.

Reference numeral 127 designates a control unit which, on the basis of the coincidence signal 111, read flag signal 116, zero detection signals 119 and 122 supplied thereto and by reference to Tables 2, 3, 4, 5 and 6 described later generates the execution request signal 128 in accordance with a relationship shown in Table 2, performs input selection of the multiplexer 123 in accordance with a relationship shown in Table 3, performs input selection of the multiplexer 124 in accordance with a relationship shown in Table 4, performs input selection of the multiplexers 125 and 126 in accordance with a relationship shown in Table 5, and generates a write flag signal 129 which is an input signal to the flag section 115 of the work register 112 in accordance with a relationship shown in Table 6.

TABLE 1

| | Input/output relationship of decoder 104 | | | |
|---|---|---|---|---|
| | | output of condition judging section 103 | | |
| | | "1" | "0" | remarks |
| output of terminal operation assigning section 72 | assign "1" output | 1 | 0 | Case a |
| | assign "0" output | 0 | 1 | case b |

TABLE 2

| The case of outputting execution request signal 128 | | | |
|---|---|---|---|
| | coincidence detection signal 111 | read flag signal 116 | zero detection signal 119 |
| Case a | 1 | 0 | — |
| Case b | — | 1 | 1 |

TABLE 3

| Input selection of multiplexer 123 | |
|---|---|
| read flag signal 116 | selected input |
| 0 | A side |
| 1 | B side |

TABLE 4

| Input selection of multiplexer 124 | |
|---|---|
| selected condition | selected input |
| except following case | A side |
| case a in Table 2 occurs | B side |

TABLE 5

| Input selection of multiplexer 125 and 126 | |
|---|---|
| selected condition | selected input |
| except following case | A side |
| cases a and b in Table | B side |

TABLE 5-continued

| Input selection of multiplexer 125 and 126 | |
|---|---|
| selected condition | selected input |
| 2 occur | B |

TABLE 6

| Write flag signal 129 | |
|---|---|
| case | write flag signal 129 |
| cases a and b in Table 2 occur, and zero detection signal 122 is 0 | 1 |
| except above cases | 0 |

The operation of the timing signal generating system arranged as mentioned above will be described by way of example in which the timing signals shown in FIG. 6 are generated.

First, it is supposed that the flag section 115 of the work register 112 has been reset beforehand. Each time the timer 106 is incremented, the time section 108 of the start register 107 is compared with an output of the timer 106. When the output of the timer 106 becomes Atl, the coincidence signal 111 which is at a "1" level is output from the comparator 110 to the control unit 127, and the following operation 1 is carried out.

Operation 1

1) Since the flag section 115 has been reset beforehand, the read flag signal 116 is at a "0" level, and the control unit 127 selects an A side input of the multiplexer 123 in accordance with Table 3. Thus, a value n of the address section 109 within the start register 107 is output to the instruction memory 101, and an instruction 81 at an n address shown in FIG. 8 is output from the instruction memory 101. Further, since the present state corresponds to a case a in Table 2, the control unit 127 delivers the execution request signal 128 to the decoder 102. Thus, the decoder 102 decodes the terminal assigning section 71 of the instruction 81 to determine a terminal A, and delivers a write signal to a flip-flop circuit corresponding to the terminal A among the plurality of flip-flop circuits constituting the flip-flop 105.

2) On the other hand, the decoder 104 decodes the terminal operation assigning section 72 of the instruction 81 and also decodes an output of the condition judging section 103 thereby to generate write data to be supplied to the selected flip-flop circuit of the flip-flop 105. In this case, since the condition assigning section 74 of the instruction 81 is "0" as shown in FIG. 8, the external condition is not judged and a "1" level is output from the condition judging section 103, and further, since the terminal operation assigning section 72 assigns an output of "1", the write data to the flip-flop circuit of the flip-flop 105 corresponding to the terminal A is at a "1" level according to Table 1.

3) As a result of the operation of items 1) and 2) described above, the change 603 shown in FIG. 6 occurs at the terminal A.

4) Since the control unit 127 has delivered the execution request signal 128 in accordance with the case a in Table 2, the control unit 127 outputs a signal (not shown) to the multiplexer 124 to select a B side input in accordance with Table 4, and the incrementer 120 is instructed to add by 1. Thus, 1 is added to n which is the output of the address section 109 of the start register 107 and the resultant n+1 is written into the address section 114 of the work register 112.

Furthermore, the control unit 127 outputs a signal (not shown) to the multiplexer 125 to select a B side input in accordance with Table 5. Thus, a value Mt1 of the waiting time assigning section 73 of the instruction 81 shown in FIG. 8 is supplied to the decrementer 117 via the multiplexer 125. As a result, at the same time when n+1 is written into the address section 114 of the work register 112, a value Mt1−1 is written into the waiting time section 113 of the work register 112.

5) The control unit 127 outputs a signal (not shown) to the multiplexer 126 to select a B side input in accordance with Table 5. On the other hand, since the waiting time Mt1 is not zero, the output of the zero detector 121 is at a "0" level, and thus, the control unit 127 outputs the write flag signal 129 at a "1" level in accordance with Table 6. As a result, "1" is written in the flag section 115 of the work register 112 at the same time when "n+1" is written in the address section 114 thereof.

6) Thereafter, each time the timer 106 is incremented, the reading out from, operation of, and writing in the work register 112 are carried out. At this time, since the A side of the multiplexer 126 is selected in accordance with Table 5, the read flag signal 116 is not operated and it is maintained as it is. Since the A side of the multiplexer 124 is selected in accordance with Table 4, and since 0 is added in the incrementer 120 (because the execution request signal 128 is "0"), the address section 114 of the work register 112 is not operated, and it is maintained as it is.

On the other hand, in the multiplexer 125, since the A side is selected in accordance with Table 5, the waiting time section 113 of the work register 112 is subtracted by 1 by the decrementer 117, and then the waiting time section 113 is again written in. Thus, the value Mt1−1 which has been written in previously becomes Mt1−2, Mt1−3, . . . in synchronism with the increment of the timer 106, and it becomes eventually zero. At this time, the zero detection signal 119 which has a "1" level is outputted from the zero detector 118 to the control unit 127, and the following operation 2 is carried out.

Operation 2

1) Since the read flag signal 116 output from the flag section 115 of the work register 112 is at a "1" level, the control unit 127 selects a B side input of the multiplexer 123 in accordance with Table 3. Thus, an output n+1 of the address section 114 of the work register 112 is delivered to the instruction memory 101, and an instruction 82 at n+1 address is outputted from the instruction memory 101 as shown in FIG. 8. Furthermore, since the present state is the case b in Table 2, the control unit 127 delivers the execution request signal 128 to the decoder 102. Thus, the decoder 102 decodes the terminal assigning section 71 of the instruction 82 to determine a terminal B as shown in FIG. 8, and the decoder 102 delivers a write signal to a flip-flop circuit corresponding to the terminal B among the plurality of flip-flop circuits constituting the flip-flop 105.

2) On the other hand, write data to the selected flip-flop circuit of the flip-flop 105 is generated by the decoder 104 by decoding the terminal operation assigning section 72 of the instruction 82 and by decoding an output of the condition judging section 103. At this time, since the condition assigning section 74 of the instruction 82 is "0", the external condition is not judged, and "1" is output from the condition judging section 103. Further, since the terminal assigning section 72 assigns an output of "1", write data to a flip-flop circuit of the flip-flop 105 corresponding to the terminal B is "1" in accordance with Table 1.

3) As a result of the operation of items 1) and 2) described above, the change 604 shown in FIG. 6 occurs at the terminal B.

4) Since the control unit 127 has delivered the execution request signal 128 in accordance with the case b in Table 2, the control unit 127 outputs a signal (not shown) to the multiplexer 124 to select an A side input in accordance with Table 4, and the incrementer 120 is instructed to add by 1. Thus, "1" is added to n+1 which is the output of the address section 114 of the work register 112, and the resultant n+2 is written into the address section 114 of the work register 112.

Furthermore, the control unit 127 outputs a signal (not shown) to the multiplexer 125 to select the B side input in accordance with Table 5. Thus, a value Mt2 of the waiting time assigning section 73 of the instruction 82 shown in FIG. 8 is supplied to the decrementer 117 via the multiplexer 125. As a result, at the same time when n+2 is written into the address section 114 of the work register 112, a value Mt2−1 is written into the waiting time section 113 of the work register 112.

5) The control unit 127 outputs a signal (not shown) to the multiplexer 126 to select the B side input in accordance with Table 5. On the other hand, since the waiting time Mt2 is not zero, the output of the zero detector 121 is at a "0" level, and thus, the control unit 127 outputs the write flag signal 129 at a "1" level in accordance with Table 6. As a result, "1" is written in the flag section 115 of the work register 112 at the same time when "n+2" is written into the address section 114 thereof.

6) Thereafter, each time the timer 106 is incremented, the reading out from, operation of, and writing into the work register 112 are carried out. At this time, since the A side of the multiplexer 126 is selected in accordance with Table 5, the read flag signal 116 is not operated and it is maintained as it is. Since the A side of the multiplexer 124 is selected in accordance with Table 4, and, since 0 is added in the incrementer 120 (because the execution request signal 128 is "0"), the address section 114 of the work register 112 is not operated, and it is maintained as it is.

On the other hand, in the multiplexer 125, since the A side is selected in accordance with Table 5, the waiting time section 113 of the work register 112 is subtracted by 1 by the decrementer 117, and then the waiting time section 113 is again written in. Thus, the value Mt2−1 which has been written in previously becomes Mt2−2, Mt2−3, . . . , in synchronism with the increment of the timer 106, and it becomes eventually zero. At this time, the zero detection signal 119, which is at a "1" level, is outputted from the zero detector 118 to the control unit 127, and the operation 2 is again carried out from item 1) described above with respect to an instruction 83 at n+2 address within the instruction memory 101.

By the execution of the instructions 83 and 84, the changes 605 and 606 in FIG. 6 take place. However, in the instruction 84 for generating the change 606, the waiting time assigning section 73 is zero. Accordingly, the control unit 127, in the Operation 2, item 5) described above and in accordance with Table 6, writes a "0" level signal into the flag section 115 of the work register 112 in order to indicate that the contents of the waiting time section 113 and the address section 114 of the work register 112 are invalid. As a result, the flag section 115 is brought into a state same as the state just before the above-mentioned operation 1 is carried out. Under this state, when the output of the timer 106 indicates the value At1 again, the operation 1 is carried out again.

Furthermore, during these operations, from the time when the timer 106 indicates a value At2, instructions 85, 86, 87 and 88 are executed by an operation similar to that mentioned above, and timing signals 607 and 608 are output from terminals C and D. However, as to the work register 112, in the work register 112 provided with registers for two words, a register, which is not used for the generation of the timing signals 601 and 602, is used.

As described above, in this embodiment, a waiting time before the execution of a next instruction is stated in an instruction, and the work register 112, the decrementer 117, the zero detector 118, etc. supervise the waiting time stated in the instruction. By virtue of this structure, although, during a time period from the time of the present increment until the time of the next increment, comparisons between the time section 108 of the start register 107 and the output of the timer 106 are carried out only two times, it is made possible to generate timing signals including eight timing signal changing points as shown in FIG. 6. In other words, so long as the number of changing points of timing signals which can be defined only by the absolute time is equal to two or less, it is possible to generate timing signals which have changing points equal to the number of words in the instruction memory. Furthermore, in order to generate timing signals having many changing points, it is only necessary to increase the number of words in the instruction memory. Moreover, when it is desired to shift the timing signals 601 and 602 in FIG. 6 maintaining their relative relationship as they are, it is only required to change the content of the time section 108 of the start register 107.

Figure 10:
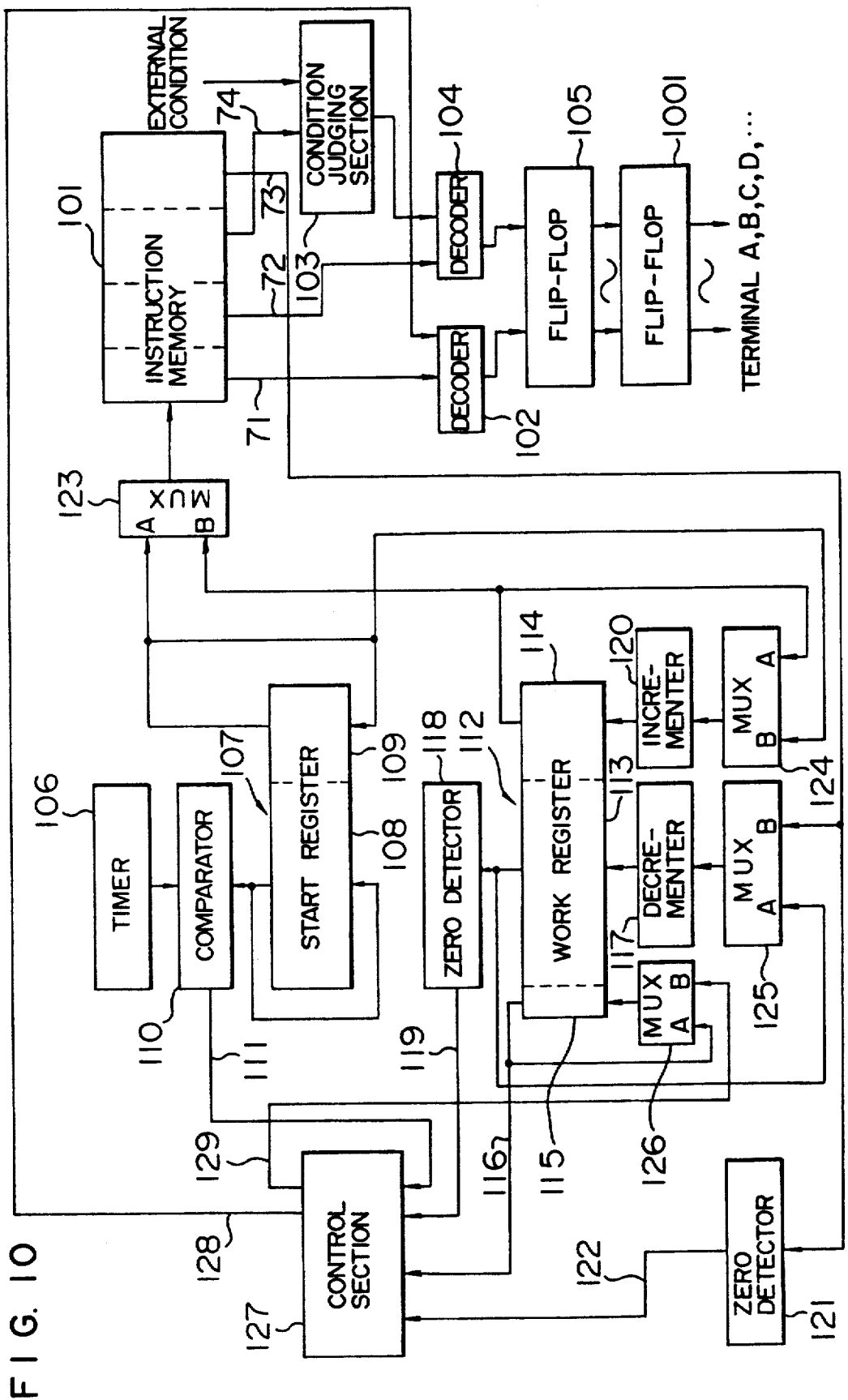
FIG. 10 is a block diagram of a timing signal generating system according to a second embodiment of the present invention.
Figure 11:
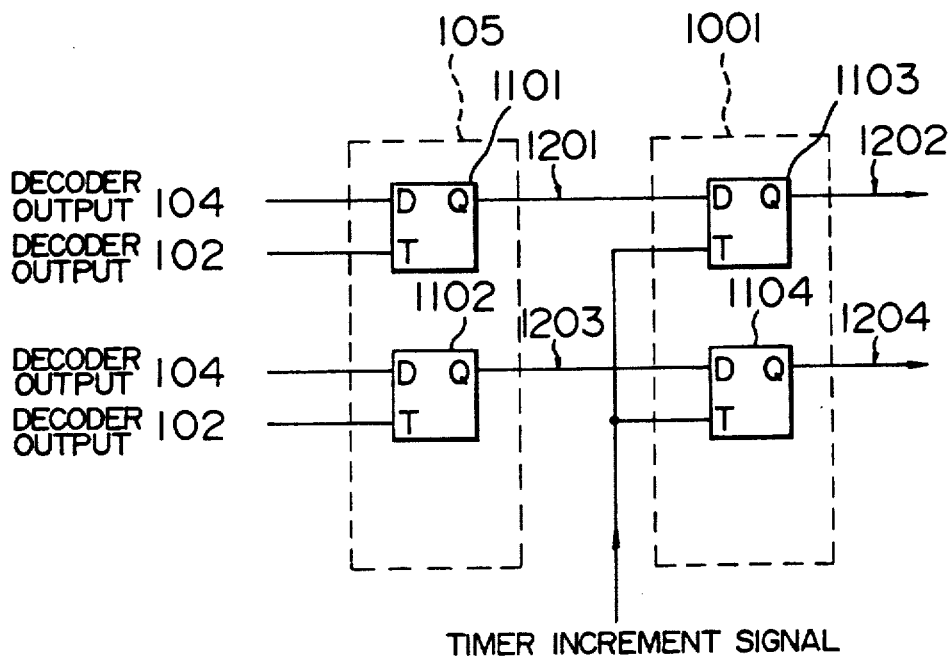
FIG. 11 is a block diagram of the flip-flops shown in FIG. 10.

FIG. 10 shows a block diagram of a second embodiment of the invention. The block diagram of FIG. 10 differs from the block diagram of FIG. 1 in that a further flip-flop 1001 is provided after the flip-flop 105. FIG. 11 shows a detailed arrangement of the flip-flops 105 and 1001.

With reference to FIG. 11, data inputs (D inputs) of the flip-flop 105 are controlled by the output of the decoder 104, and timing inputs (T inputs) are controlled by the output of the decoder 102. Furthermore, data inputs (D inputs) of the flip-flop 1001 are connected to Q outputs of the flip-flop 105, and timing inputs (T inputs) are connected to a timer increment signal which increments the timer 106. Further, reference numerals 1101 and 1102 designate concrete flip-flop circuits which constitute the flip-flop 105, and reference numerals 1103 and 1104 designate concrete flip-flop circuits which constitute the flip-flop 1001.

Figure 12:
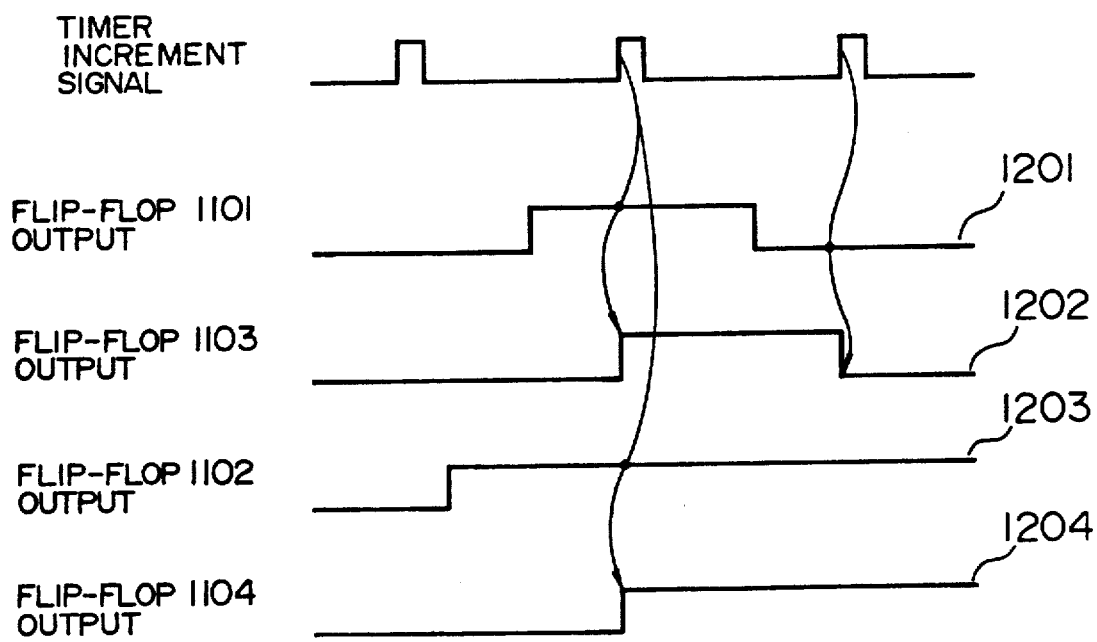
FIG. 12 is a timing chart of timing signals of the timing signal generating system of FIG. 10.

The operation of the timing signal generating system arranged as mentioned above will be described. In FIG. 10, the operation of the timing signal generating system is the same as that of the system of FIG. 1 up to the operation of the flip-flop 105, and the description will be omitted. Thus, the operation of the flip-flop 1001 will be described. A case will be considered in which the flip-flop 1101 is operated due to the execution of the instruction, and a timing signal 1201 is generated as shown in FIG. 12. In this case, the D input of the flip-flop circuit 1103 is connected to the Q output of the flip-flop circuit 1101, and the T input is connected to the timer increment signal. Accordingly, the Q output of the flip-flop circuit 1103 is changed in synchronism with the timer increment signal, and a timing signal 1202 is generated. Similarly, when the Q output of the flip-flop circuit 1102 generates a timing signal 1203, the Q output of the flip-flop circuit 1104 outputs a timing signal 1204 which is in synchronization with the timer increment signal.

As described above, in the second embodiment of the present invention, by providing the flip-flop 1001 having the T inputs connected to receive the timer increment signal, irrespective of the fact that the timing of output changes of the flip-flop 105 is dependent on the timing of instruction execution, it is possible to give an appearance such that the timing signals are changing uniformly with the accuracy of the timer increment signal provided externally.

Figure 13:
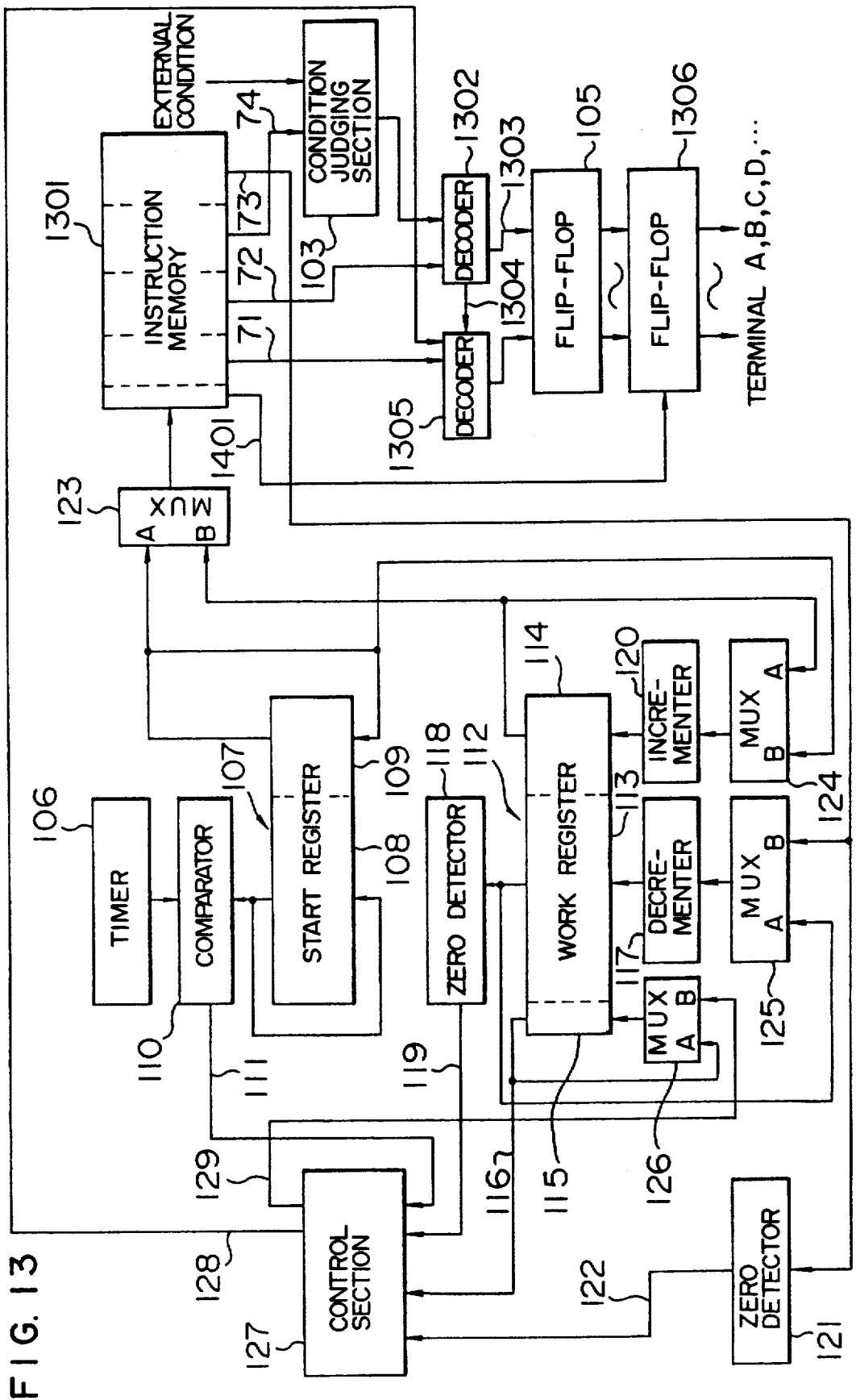
FIG. 13 is a block diagram of a timing signal generating system according to a third embodiment of the present invention.

FIG. 13 is a block diagram of a third embodiment of the present invention. The differences between the block diagram of FIG. 13 and the diagram of FIG. 10 reside in that an instruction memory 1303 has a bit width increased by 1 bit as compared with the instruction memory 101, and a decoder 1302, a decoder 1305, and a flip-flop 1306 are respectively changed to some extent as compared with the decoder 104, the decoder 102, and the flip-flop 105, and that an operation, which can be assigned by the terminal operation assigning section 72 of the instruction, is added. Table 7 shown below indicates a relationship between an input of the decoder 1302 and an output signal 1303 which is a data input to the flip-flop 105. In Table 7, cases c and d represent the added terminal operation mentioned above. The decoder 1302 differing from the decoder 104 outputs a write enabling signal 1304 to the decoder 1305, and this is shown in Table 8.

TABLE 7

| | Output signal 1303 of decoder 1302 | | |
|---|---|---|---|
| | | output of condition judging section 103 | |
| | | "1" | "0" | remarks |
| output of terminal operation assigning section 72 | "1" output is assigned | 1 | 0 | case a |
| | "0" output is assigned | 0 | 1 | case b |
| | AND result is assigned | don't care | 0 | case c |
| | OR result is assigned | 1 | don't care | case d |

TABLE 8

| | Write enabling signal 1304 outputted from decoder 1302 | | |
|---|---|---|---|
| | | output of condition judging section 103 | |
| | | "1" | "0" | remarks |
| output of terminal operation assigning section 72 | "1" output is assigned | 1 | | case a |
| | "0" output is assigned | 1 | | case b |
| | AND output is assigned | 0 | 1 | case c |
| | OR output is assigned | 1 | 0 | case d |

TABLE 8-continued

| | Write enabling signal 1304 outputted from decoder 1302 | | |
|---|---|---|---|
| | | output of condition judging section 103 | |
| | | "1" | "0" | remarks |
| is assigned | | | | |

Furthermore, the decoder 102 in FIG. 1 decodes the terminal assigning section 71 of the instruction, and, when the execution request signal 128 is at the "1" level, it outputs the write signal to the corresponding flip-flop 105, whereas the decoder 1305 in FIG. 13 outputs a write signal to the flip-flop 105 corresponding to the result of decoding when both the execution request signal 128 and the write enabling signal 1304 are at the "1" level. Accordingly, the instructions added in this embodiment and shown in cases c and d in Table 7 perform the following operation.

The Instruction in Case C

When the output of the condition judging section 103 is at a "0" level, clears the flip-flop 105 to become "0". When the output of the condition judging section 103 is at a "1" level, the flip-flop 105 is not operated.

The Instruction in Case D

When the output of the condition judging section 103 is at a "1" level, sets the flip-flop 105 to "1". When the output of the condition judging section 103 is at a "0" level, the flip-flop 105 is not operated.

FIG. 14 shows a format of an instruction stored in the instruction memory 1301. A difference of this instruction format from that shown in FIG. 7 is that a transfer assigning section 1401 is provided. The transfer assigning section 1401 includes a bit which controls whether the flip-flop 1306 fetches the Q output of the flip-flop 105 or not. When the transfer assigning section 1401 is at a "1" level, it indicates to make a transfer.

FIG. 15 is a detailed block diagram showing the flip-flop 105 and the flip-flop 1306. In FIG. 15, a data input of a flip-flop circuit 1101 which is included in the flip-flop 105 is connected to the output of the decoder 1302, and a timing input is connected to the output of the decoder 1305. Further, a data input of a flip-flop circuit 1103 which is included in the flip-flop 1306 is connected to the Q output of the flip-flop circuit 1101. Further, a timing input of the flip-flop circuit 1103 is supplied with a timer increment signal through a gate 1501. As a result, only when the transfer assigning section 1401 is at a "1" level, the output of the flip-flop 105 is fetched into the flip-flop 1306.

The operation of the timing signal generating system as arranged as shown in FIGS. 13 to 15 will be described by way of example in which a timing signal 1601 shown in FIG. 16 is generated.

The solid line portion of the timing signal 1601 represents a waveform in which all external conditions judged by the condition judging section 103 with respect to three positions (1602, 1604, and 1606 in FIG. 16) are at a "1" level. The broken line portion represents a waveform in which any of the external conditions at the three positions is at a "0" level. In generating these timing signal changes, instructions 1701, 1702 and 1703 shown in FIG. 17 are stored in the instruction memory 1301. The instructions 1701, 1702 and 1703 are respectively executed at the positions 1602, 1604 and 1606 shown in FIG. 16 by a similar procedure as is used in the embodiments described earlier.

At the position 1602, the instruction 1701 is executed. At this time, when the external condition is at a "1" level, the condition judging section 103 outputs "1", and the decoder 1302 outputs an output signal 1303 which is at a "1" level and a write enabling signal 1304 in accordance with case a in Tables 7 and 8. Thus, the decoder 1305 delivers a write signal to the flip-flop circuit 1101 of the flip-flop 105, and the output of the flip-flop circuit 1101 becomes the solid line shown at the position 1602.

On the other hand, when the external condition is at a "0" level, the decoder 1302 delivers an output signal 1303 which is at a "0" level and a write enabling signal 1304 which is at a "1" level in accordance with case a in Tables 7 and 8. Thus, the decoder 1305 delivers a write signal to the flip-flop circuit 1101 of the flip-flop 105, and the output of the flip-flop circuit 1101 is represented by the broken line shown at the position 1602 in FIG. 16. However, since a transfer assigning section 1401 of the instruction 1701 is at a "0" level as shown in FIG. 17, the gate 1501 of the flip-flop 1306 is closed, and the output of the flip-flop circuit 1101 is never transferred to the flip-flop 1306 by the timer increment signal. As a result, as shown by the solid line at the position 1603 in FIG. 16, the timing signal 1601, whose previous output is maintained, is outputted from the flip-flop circuit 1103.

At the position 1604, the instruction 1702 is executed. However, when the external condition is at a "1" level, the condition judging section 103 outputs "1", and the decoder 1302 outputs a write enabling signal 1304 which is at a "0" level in accordance with case c in Table 8. Thus, the output of the flip-flop circuit 1101 is not changed, and this output is represented by the solid line shown at the position 1604.

On the other hand, when the external condition is at a "0" level, the decoder 1302 outputs an output signal 1303 which is at a "0" level and a write enabling signal 1304 which is at a "1" level in accordance with case a in Table 7, and the output of the flip-flop circuit 1101 of the flip-flop 105 becomes a timing signal shown by the broken line at the position 1604. In other words, the output of the flip-flop circuit 1101 after completion of the execution of the instruction 1702 becomes "1" at the positions 1602 and 1604 only when both the external conditions are at a "1" level, and otherwise becomes "0".

Furthermore, similar to the previous case, since the transfer assigning section 1401 of the instruction 1701 is in any case at the "0" level as shown in FIG. 17, the gate 1501 of the flip-flop 1306 is closed, and the output of the flip-flop circuit 1101 of the flip-flop 105 is never transferred to the flip-flop circuit 1103 by the timer increment signal. As a result, the timing signal 1601 is outputted from the flip-flop 1103 in which the previous output is maintained at the position 1605 as shown by the solid line.

At the position 1606, the instruction 1703 is executed, and at this time, the operation of the flip-flop circuit 1101 is the same as the operation at the position 1605. Accordingly, the output of the flip-flop circuit 1101 at the position 1606 becomes "1" only when the external conditions at the positions 1602, 1604 and 1606 are at a "1" level, and otherwise the output becomes "0".

Furthermore, since the transfer assigning section 1401 of the instruction 1703 is at a "1" level as shown in FIG. 17, the output of the flip-flop circuit 1101 is transferred to the flip-flop circuit 1103, and the level of the timing signal is shown at the position 1607 in FIG. 16. In other words, the timing signal 1601 at this position is a result of judgement of the external conditions at the three different positions 1602, 1604 and 1606 in time in accordance with the logical product (AND). On the other hand, when it is desired to output a result of judgement of the external conditions at the positions 1602, 1604 and 1606 in accordance with the logical add (OR), the instructions 1701, 1702 and 1703 may be replaced by instructions corresponding to case d in Table 7.

In this embodiment, as described above, it is possible to generate a timing signal which reflects the result of judgement of external conditions of different positions in time by providing an instruction for instructing not to change the content of the flip-flop 105 depending on the result of judgement of the external conditions, by providing the decoders 1302 and 1305 to execute the instruction, and by providing the bit for controlling the transfer of the output from the flip-flop 105 to the flip-flop 1306.

As described in the foregoing, in accordance with the present invention, the execution of instructions is not all controlled by the absolute time, and the control of the execution of instructions in accordance with relative time, which instructions contain a waiting time until the execution of a next instruction, is used jointly. As a result, the number of changes to be generated in the timing signal is separated from, or made independent of the number of comparisons between the absolute time and the desired output time, which comparisons are allowed to be performed in a period in which the timer for generating the output standard time is incremented. Specifically, it is made possible that the number of timing signal changes allowed to be generated is basically dependent solely on the number of words of the memory. Owing to this, in the present invention, it is possible to generate by software a timing signal having many changing points and having high accuracy, and thus the present invention has a high practical value.

We claim:

1. A timing signal generating system for generating a plurality of timing signals by the execution of instructions which state timing signal changes, comprising:

a) a plurality of flip-flops;

b) an instruction memory for storing a plurality of instructions, each including at least an operation field having timing signal changes stated therein and a waiting time field having stated therein a waiting time from the time when a present invention has been executed until an instruction of a next address is executed;

c) a timer whose content is incremented at a constant time interval T;

d) first instruction execution requesting means for storing a desired value to be compared with an output of said timer, storing a desired address to be output to said instruction memory and outputting the desired address stored therein beforehand to said instruction memory and simultaneously outputting an instruction execution request signal, when the output of said timer becomes equal to the desired value stored therein beforehand;

e) second instruction execution requesting means for calculating an address of an instruction to be executed next time based on an address of an instruction under request for execution, storing the address obtained as a result of the calculation and storing a waiting time field stated in the instruction under the request for execution, when either one of said first instruction execution requesting means and said second instruction execution requesting means has requested execution of the instruction, and thereafter outputting the stored address to said instruction memory and simultaneously outputting the instruction execution request signal, when the content of the stored waiting time field becomes zero as a result of subtraction effected in synchronism with the increment of said timer; and f) execution means for decoding at least the operation field of the instruction output from said instruction memory and for performing one of the operations of setting and resetting said flip-flops in accordance with a result of the decoding operation, when the instruction execution request signal has been output from one of said first instruction execution requesting means and said second instruction execution requesting means.

2. A timing signal generating system for generating a plurality of timing signals by the execution of instructions which state timing signal changes, comprising:

a) a plurality of flip-flops;

b) an instruction memory for storing a plurality of instructions, each including at least an operation field having timing signal changes stated therein and a waiting time field having stated therein a waiting time from the time when a present instruction has been executed until an instruction of a next address is executed;

c) a timer whose content is incremented at a constant time interval T;

d) a plurality of first registers for storing a comparison value to be compared with an output of said timer and an address to be delivered to said instruction memory, said comparison value and said address being stored as a pair of data;

e) a comparator for comparing an output of said timer with the comparison value stored in said first registers;

f) first instruction execution requesting means for making said comparator compare the output of said timer with all the comparison values stored in said first registers by the time sharing use of said comparator each time said timer is incremented, outputting the address stored as the pair of data in said first registers to said instruction memory and simultaneously outputting an instruction execution request signal, when the output of said timer and the comparison values stored in said first registers coincide with each other;

g) address calculating means for obtaining an address of an instruction to be executed next time based on the address delivered to said instruction memory, when an instruction output from said instruction memory has been executed;

h) a plurality of second registers for storing a waiting time field of an instruction output from said instruction memory and storing an output of said address calculating means, said waiting time field and said output of said address calculating means being stored as a pair of data;

i) a decrementer for subtracting the waiting time stored in said second registers;

j) second instruction execution requesting means for fetching the output of said address calculating means and the waiting time field of the instruction output from said instruction memory into said second registers, when either one of said first instruction execution requesting means and said second instruction execution requesting means has requested execution of the instruction, thereafter, decrementing all the waiting time fetched into said second registers by said decrementer which performs a time sharing operation in synchronism with the increment of said timer, and outputting the address stored as the pair of data in said second registers to said instruction memory and simultaneously outputting the instruction execution request signal, when the content of said second registers becomes zero;

k) execution means for decoding at least the operation field of the instruction output from said instruction memory and for performing one of the operations of setting and resetting said flip-flops in accordance with a result of the decoding operation, when the instruction execution request signal has been output from either one of said first instruction execution requesting means and said second instruction execution requesting means; and l) synchronizing means for outputting the output from said execution means in synchronism with increment timing of said timer.

3. A timing signal generating system for generating a plurality of timing signals by the execution of instructions which state timing signal changes, comprising:

a) a plurality of first flip-flops b) a timer whose content is incremented by counting a reference clock signal having a constant time interval T supplied externally;

c) a plurality of second flip-flops for fetching an output of said first flip-flops in synchronism with the reference clock signal and outputting the output to the outside of said system;

d) an instruction memory for storing instructions, each including at least a flip-flop designating field for designating a particular one of said first flip-flops and a particular one of said second flip-flops, an operation field for instructing an operation of said first flip-flops, a transfer control bit for instructing data transfer from the designated particular one of said first flip-flops to the designated particular one of said second flip-flops, an external condition designating field for designating an external condition to be taken into account at the time of executing an instruction, and a waiting time field stating a time interval from the time when a present instruction has been executed until an instruction of a next address is executed, said time interval being stated in terms of a period of the reference clock signal as one unit;

e) a plurality of first registers for storing a comparison value to be compared with an output of said timer and an address to be delivered to said instruction memory, said comparison value and said address being stored as a pair of data;

f) a comparator for comparing an output of said timer with the comparison value stored in said first registers;

g) first instruction execution requesting means for making said comparator compare the output of said timer with all the comparison values stored in said first registers by the time sharing use of said comparator each time said timer is incremented, outputting the address stored as the pair of data in said first registers to said instruction memory and simultaneously outputting an instruction execution request signal, when the output of said timer and the comparison values stored in said first registers coincide with each other;

h) address calculating means for obtaining an address of an instruction to be executed next time based on the address delivered to said instruction memory, when an instruction output from said instruction memory has been executed;

i) a plurality of second registers for storing a waiting time field of an instruction output from said instruction memory and storing an output of said address calculating means, said waiting time field and said output of said address calculating means being stored as a pair of data;

j) a decrementer for subtracting the waiting time stored in said second registers;

k) second instruction execution requesting means for fetching the output of said address calculating means and the waiting time of the instruction output from said instruction memory into said second registers, when either one of said first instruction execution requesting means and said second instruction execution requesting means has requested execution of the instruction, thereafter, decrementing all the waiting times fetched into said second registers by said decrementer which performs a time sharing operation in synchronism with the increment of said timer, and outputting the address stored as the pair in said second registers to said instruction memory and simultaneously outputting the instruction execution request signal, when the content of said second registers becomes zero;

l) execution means for decoding the operation field of the instruction output from said instruction memory and for performing one of the operations of setting and resetting said first flipflops in accordance with a result of the decoding operation, when the instruction execution request signal has been output from either one of said first instruction execution requesting means and said second instruction execution requesting means; and m) transfer control means for performing data transfer from the particular one of said first flip-flops to the particular one of said second flipflops, which have been designated by the flip-flop designating field, respectively, in synchronism with the reference clock signal, only when the transfer control bit of the instruction output from said instruction memory has instructed said data transfer.

* * * * *